United States Patent
Gwilliams et al.

(10) Patent No.: US 12,212,698 B2
(45) Date of Patent: Jan. 28, 2025

(54) METHOD FOR INTEGRATING BLOCKCHAIN NODE COMPLIANCE DATA WITHIN BLOCKCHAIN TRANSACTION DATA

(71) Applicant: Saudi Arabian Oil Company, Dhahran (SA)

(72) Inventors: John Gwilliams, Dhahran (SA); Sultan Saadaldean Alsharif, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 344 days.

(21) Appl. No.: 17/820,377

(22) Filed: Aug. 17, 2022

(65) Prior Publication Data
US 2024/0064031 A1    Feb. 22, 2024

(51) Int. Cl.
*H04L 9/06* (2006.01)
*H04L 9/00* (2022.01)

(52) U.S. Cl.
CPC .............. *H04L 9/50* (2022.05); *H04L 9/0643* (2013.01)

(58) Field of Classification Search
CPC ................................ H04L 9/0643; H04L 9/50
USPC ......................................................... 713/168
See application file for complete search history.

(56) References Cited

U.S. PATENT DOCUMENTS

| | | | |
|---|---|---|---|
| 2019/0116038 A1* | 4/2019 | Sprague | H04L 9/3226 |
| 2019/0372776 A1* | 12/2019 | Kroneisen | H04L 9/30 |
| 2020/0067708 A1* | 2/2020 | Subba | H04L 9/3226 |
| 2020/0112446 A1* | 4/2020 | Yoshihama | G06F 16/1805 |
| 2020/0259660 A1* | 8/2020 | Tewari | H04L 9/3236 |
| 2020/0374106 A1 | 11/2020 | Padmanabhan | |
| 2022/0027803 A1 | 1/2022 | Ieazabal et al. | |
| 2022/0092593 A1* | 3/2022 | Wright | G06Q 20/065 |

FOREIGN PATENT DOCUMENTS

WO    WO 2022017413    1/2022

* cited by examiner

*Primary Examiner* — Michael S McNally
(74) *Attorney, Agent, or Firm* — Fish & Richardson P.C.

(57) ABSTRACT

Implementations provide a computer-implemented method that includes: accessing, by a node of a blockchain network, a first set of data encoding a set of transaction records, wherein the blockchain network comprises a plurality of consensus nodes; at least based on the first set of data, generating, by the node, a transaction hash for the set of transaction; accessing a second set of data encoding a compliance status of the node of the blockchain network; at least based on the second set of data; generating, by the node, a compliance hash for the node of blockchain network; generating, by the node, a root hash that combines the transaction hash and the compliance hash; and submitting, by the node and to the plurality of consensus nodes of the blockchain network, a block that includes the root hash for entry into the blockchain.

20 Claims, 7 Drawing Sheets

METHOD FOR INTEGRATING BLOCKCHAIN NODE COMPLIANCE DATA WITHIN BLOCKCHAIN TRANSACTION DATA

TECHNICAL FIELD

This disclosure generally relates to large block chain networks involving a large number of nodes, including consensus nodes.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

SUMMARY

In one aspect, some implementations provide a computer-implemented method to enforce trustworthiness of nodes on a blockchain network hosting a blockchain, the method comprising: accessing, by a node of the blockchain network, a first set of data encoding a set of transaction records, wherein the blockchain network comprises a plurality of consensus nodes; at least based on the first set of data, generating, by the node, a transaction hash for the set of transaction records; accessing a second set of data encoding a compliance status of the node of the blockchain network; at least based on the second set of data, generating, by the node, a compliance hash for the node of blockchain network; generating, by the node, a root hash that combines the transaction hash and the compliance hash; and submitting, by the node and to the plurality of consensus nodes of the blockchain network, a block that includes the root hash for entry into the blockchain.

Implementations may include one or more of the following features.

The compliance status of the node may be provided by at least one of: an integrity check of the node's hard disk drives, an integrity check of the node's file system, or an integrity check of a database file on the node. The transaction may include at least one smart contract, which, when executed on an Ethereum Virtual Machine (EVM), causes the EVA/I's hosting node to perform a function. The function may include generating a compliance status of the hosting node by generating at least one of: an integrity check of the hosting node's hard disk drives, an integrity check of the hosting node's file system, or an integrity check of a database file on the hosting node.

Generating the root hash may include applying a hashing function using a nonce such that the root hash leads with at least a pre-determined number of zeros. Applying a hashing function may include: applying a secure hash algorithm (SHA)-256. The block being submitted may further include the nonce such that the consensus nodes determine the encoded transaction hash and compliance hash are valid before entering the block into the blockchain. The node may be a consensus node, and wherein the root hash may be a Merkel root hash.

In another aspect, some implementations may provide a computer system to enforce trustworthiness of nodes on a blockchain network hosting a blockchain, the computer system residing on a node of the blockchain network and comprising at least one processor configured to perform operations of: accessing, by a node of the blockchain network, a first set of data encoding a set of transaction records, wherein the blockchain network comprises a plurality of consensus nodes; at least based on the first set of data, generating, by the node, a transaction hash for the set of transaction records; accessing a second set of data encoding a compliance status of the node of the blockchain network; at least based on the second set of data, generating, by the node, a compliance hash for the node of blockchain network; generating, by the node, a root hash that combines the transaction hash and the compliance hash; and submitting, by the node and to the plurality of consensus nodes of the blockchain network, a block that includes the root hash for entry into the blockchain.

Implementations may include one or more of the following features.

The compliance status of the node may be provided by at least one of: an integrity check of the node's hard disk drives, an integrity check of the node's file system, or an integrity check of a database file on the node. The transaction may include at least one smart contract, which, when executed on an Ethereum Virtual Machine (EVM), causes the EVM's hosting node to perform a function. The function may include generating a compliance status of the hosting node by generating at least one of: an integrity check of the hosting node's hard disk drives, an integrity check of the hosting node's file system, or an integrity check of a database file on the hosting node.

Generating the root hash may include applying a hashing function using a nonce such that the root hash leads with at least a pre-determined number of zeros. Applying a hashing function may include: applying a secure hash algorithm (SHA)-256. The block being submitted may further include the nonce such that the consensus nodes determine the encoded transaction hash and compliance hash are valid before entering the block into the blockchain. The node may be a consensus node, and wherein the root hash may be a Merkel root hash.

In yet another aspect, some implementations provide a non-transitory computer-readable medium comprising software to enforce trustworthiness of nodes on a blockchain network hosting a blockchain, which software, when executed by a processor of a node on the blockchain network, causes the processor to perform operations of: accessing, by a node of the blockchain network, a first set of data encoding a set of transaction records, wherein the blockchain network comprises a plurality of consensus nodes; at least based on the first set of data, generating, by the node, a transaction hash for the set of transaction records; accessing a second set of data encoding a compliance status of the node of the blockchain network; at least based on the second set of data, generating, by the node, a compliance hash for the node of blockchain network; generating, by the node, a root hash that combines the transaction hash and the compliance hash; and submitting, by the node and to the plurality of consensus nodes of the blockchain network, a block that includes the root hash for entry into the blockchain.

Implementations may include one or more of the following features.

The compliance status of the node may be provided by at least one of: an integrity check of the node's hard disk drives, an integrity check of the node's file system, or an integrity check of a database file on the node. The transaction may include at least one smart contract, which, when executed on an Ethereum Virtual Machine (EVM), causes the EVM's hosting node to perform a function. The function may include generating a compliance status of the hosting node by generating at least one of: an integrity check of the hosting node's hard disk drives, an integrity check of the hosting node's file system, or an integrity check of a database file on the hosting node.

Generating the root hash may include applying a hashing function using a nonce such that the root hash leads with at least a pre-determined number of zeros. Applying a hashing function may include: applying a secure hash algorithm (SHA)-256. The block being submitted may further include the nonce such that the consensus nodes determine the encoded transaction hash and compliance hash are valid before entering the block into the blockchain. The node may be a consensus node, and wherein the root hash may be a Merkel root hash.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

The technology relates to integrating Smart Contract functionality within block chain implementations to generate immutable compliance data regarding each node on the blockchain network. This data will then be stored on the blockchain implementation along with transactional data. The compliance data can be queried by consensus nodes of the blockchain network to verify the compliance of a given node to a set of applicable security controls. As the given node deviates from acceptable compliance baselines, the given node's threat level increases, allowing the consensus nodes to apply threat mitigation. If the given node compliance level reaches a threshold condition, the given node may be terminated from the blockchain network and new transactions by the given node can be voided by the consensus process.

Within a blockchain environment, the security of a participating node is paramount to the efficient and secure operation of the blockchain network. Whilst the transactions are vetted using consensus mechanisms, the integrity of each network node itself is subject to traditional cyber security processes that operate outside of blockchain mechanisms. Under the blockchain mechanism, only the submitted "block" or encrypted list of transactions is immutable during the consensus process.

Implementations of the present disclosure aims to introduce specific compliance data into the blockchain network, creating an immutable ledger of node compliance data. This compliance data can be analyzed by the consensus nodes within the blockchain network to determine a level of trust that can be placed on the participating node generating the transaction. This level of trust can then be used as a weighting factor when determining whether a given transaction is coming from a compromised source and can trigger additional actions prior to the submitted data being accepted into the chain.

Figure 1:
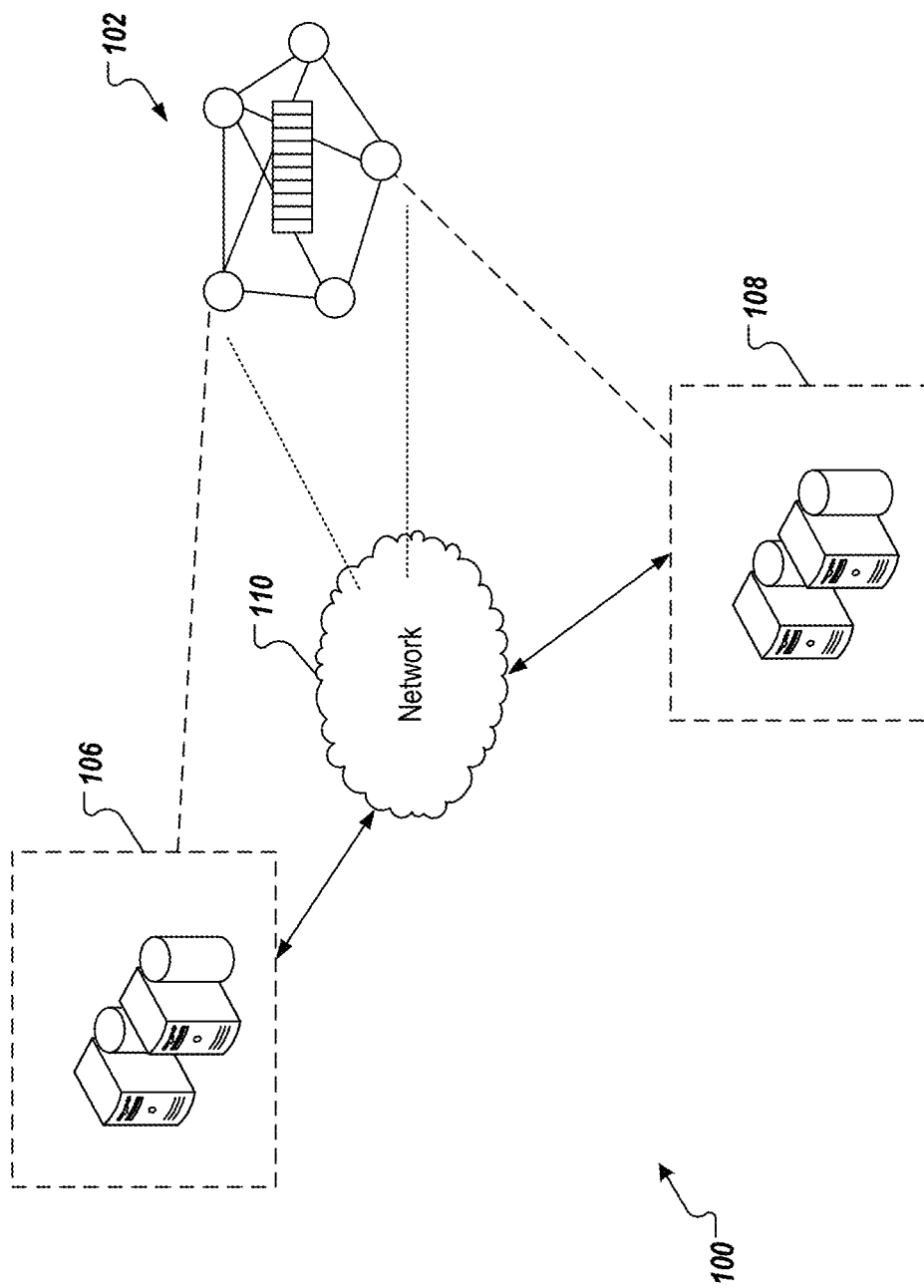
FIG. 1 is a diagram illustrating an example of a blockchain environment according to an implementation of the present disclosure.

Referring to FIG. 1, a diagram illustrates an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
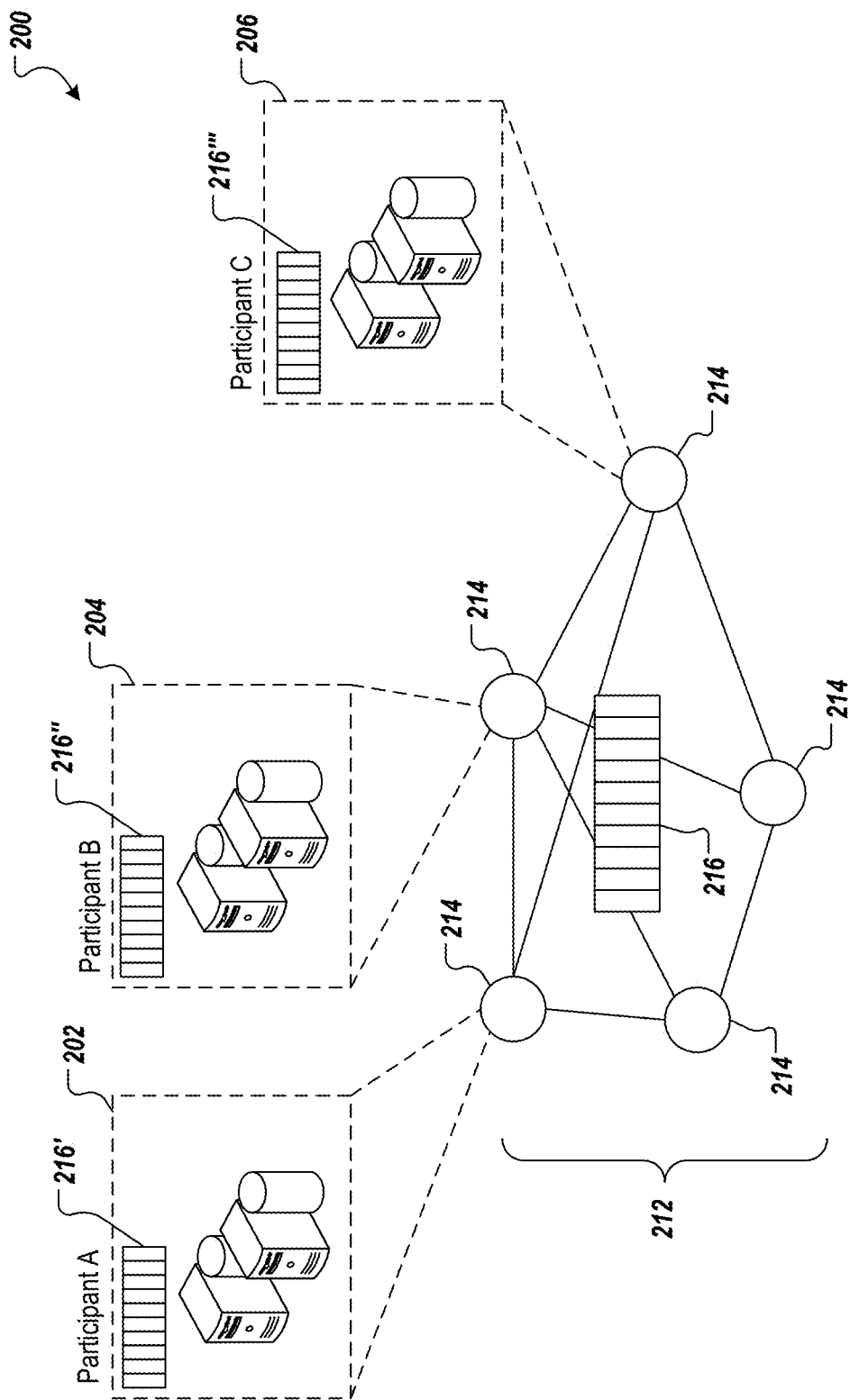
FIG. 2 is a diagram illustrating an example of a block network architecture according to an implementation of the present disclosure.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

The consensus mechanism of blockchain network is also called proof of work (PoW). As described above in association with FIGS. 1 and 2, consensus nodes (also referred to as miners) may compete to produce new blocks of processed transactions. In public and private blockchain networks, compromising the consensus mechanism may entail an attacker gaining access to over 51% of the consensus nodes. In a public blockchain network, the scenario may boil down to compromising multiple distributed systems in different locations. However, in a private blockchain network, an internal attacker may be better positioned to target the whole blockchain and reach the 51% requirement with less effort. In such a scenario, integrating node compliance data within the blockchain can help to ensure the blockchain network is able to self-regulate when node status changes.

Figure 3:
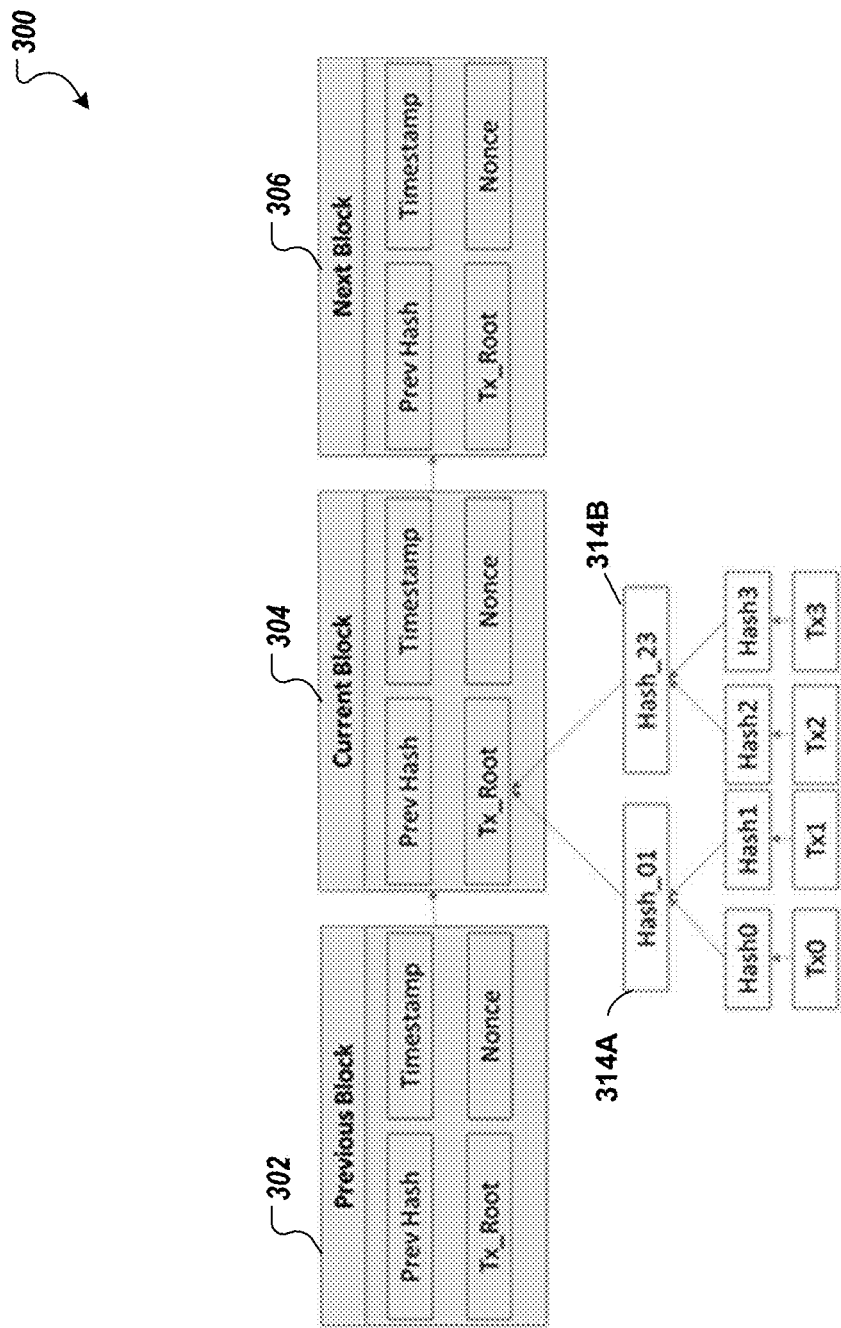
FIG. 3 is a diagram illustrating an example of blocks in a blockchain according to an implementation of the present disclosure.

As detailed above in association with FIGS. 1 and 2, in some implementations, a block includes of hashed transactional data that is aggregated. As illustrated in diagram 300 of FIG. 3, blocks 302, 304, 306 each includes a previous hash, a timestamp for adding the block to the blockchain, a transaction hash (Tx_root), and a nonce. Here, Tx_root represents a Merkle root hash for all transactions (up to the corresponding block). In block 304, for example, four transactions, namely, Tx0, Tx1, Tx2 & Tx3, are the source transactions being hashed in hash values Hash0, Hash1, Hash2 and Hash3. In this example, pairs of hashes are concatenated to form the top level hash tables Hash_01 (314A) and Hash_23 (314B). These top level hash tables are then concatenated to form the submission of block 304 to the blockchain. In these implementations, compliance data from traditional compliance tools can be added to the blockchain by each node, every time a transaction block is being submitted to the blockchain.

Figure 4:
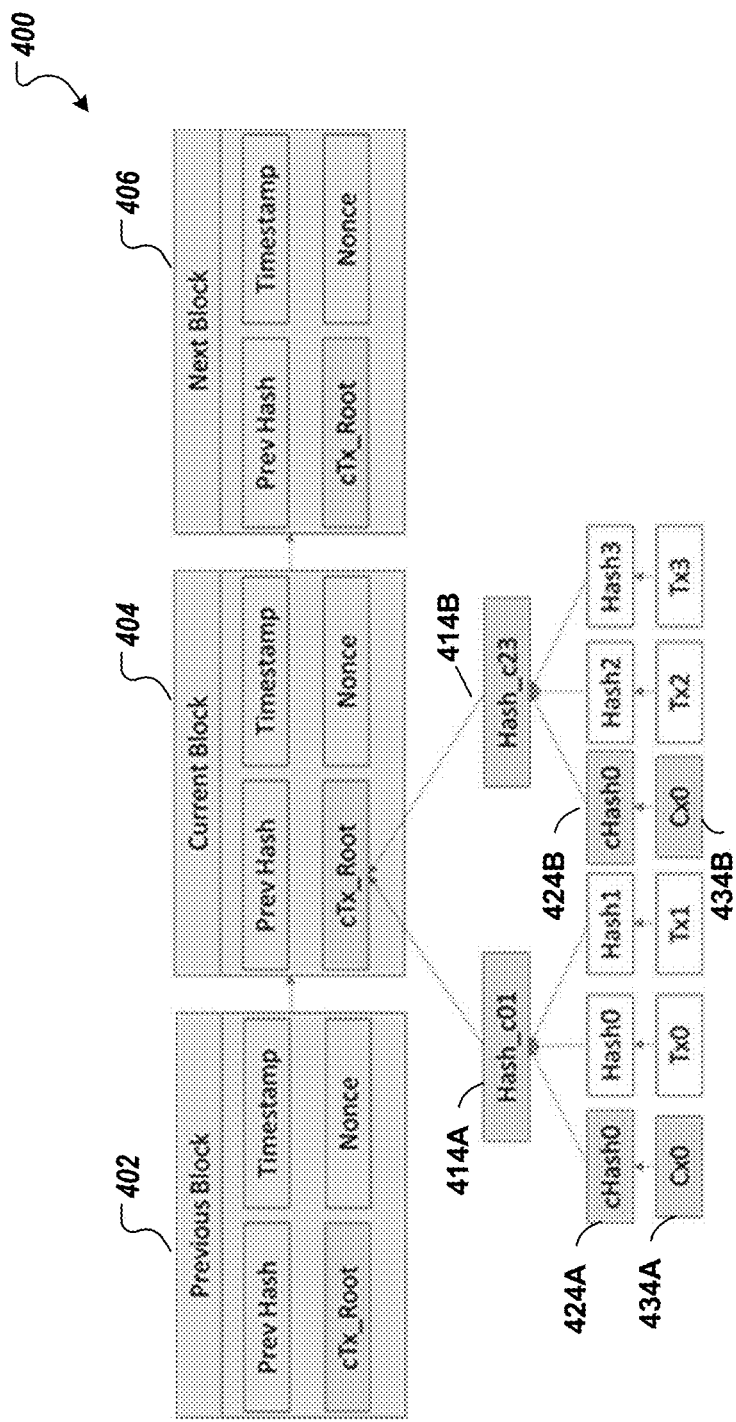
FIG. 4 is a diagram illustration another example of blocks in a blockchain according to an implementation of the present disclosure.

Referring to FIG. 4, diagram 400 shows that implementations may introduce the compliance transaction (Cx0), alongside the regular transaction data. The compliance transaction (Cx0) is an aggregated score from compliance checks performed against the underlying node and can include, for example, data integrity checks results, malware detection results, suspicious port activity summary, threat intelligence data from installed security products, or other cybersecurity metric. The implementations may, based on the compliance transaction data, generate a hash value cHash0 for each top level hash table. As illustrated, compliance transaction data Cx0 (e.g., 434A and 434B) may be hashed into cHash0 (424A and 424B), Implementations may then concatenate the compliance hashes (424A and 424B) and regular transaction data hashes (e.g., Hash0, Hash1, and Hash2 and Hash3) to generate compliance transaction hash, referred to as Hash_c01 (414A) and Hash_c23 (414B) in FIG. 4. Hash_c01 (414A) and Hash_c23 (414B) may then form the root hash cTx_Root of block 404. Indeed, each top level hash can now concatenate one or more compliance hashes into the Merkel root hash.

In some implementations, Ethereum Virtual Machine (EV VI) can be used to generate hashed compliance data within the blockchain. In these implementations, the Ethereum Runtime environment can operate smart contracts and decentralized applications (DApp). In one illustration, along with the Blockchain's normal operational DApps or smart contracts, a compliance DApp can be deployed via the blockchain network to perform compliance checks on the node and the node's host system. The additional complexity provided by these implementations can provide different compliance check results than those in FIG. 4. Here, the DApps may generate a series of compliance results (Cx0, Cx1, . . . , Cxn-1, Cxn) that provide a more comprehensive overview of the compliance of the host and node. The data is similarly hashed into respective hash values (cHash0, cHash1, . . . , cHashn-1, cHashn) and submitted to the blockchain network, as discussed above.

Figure 5:
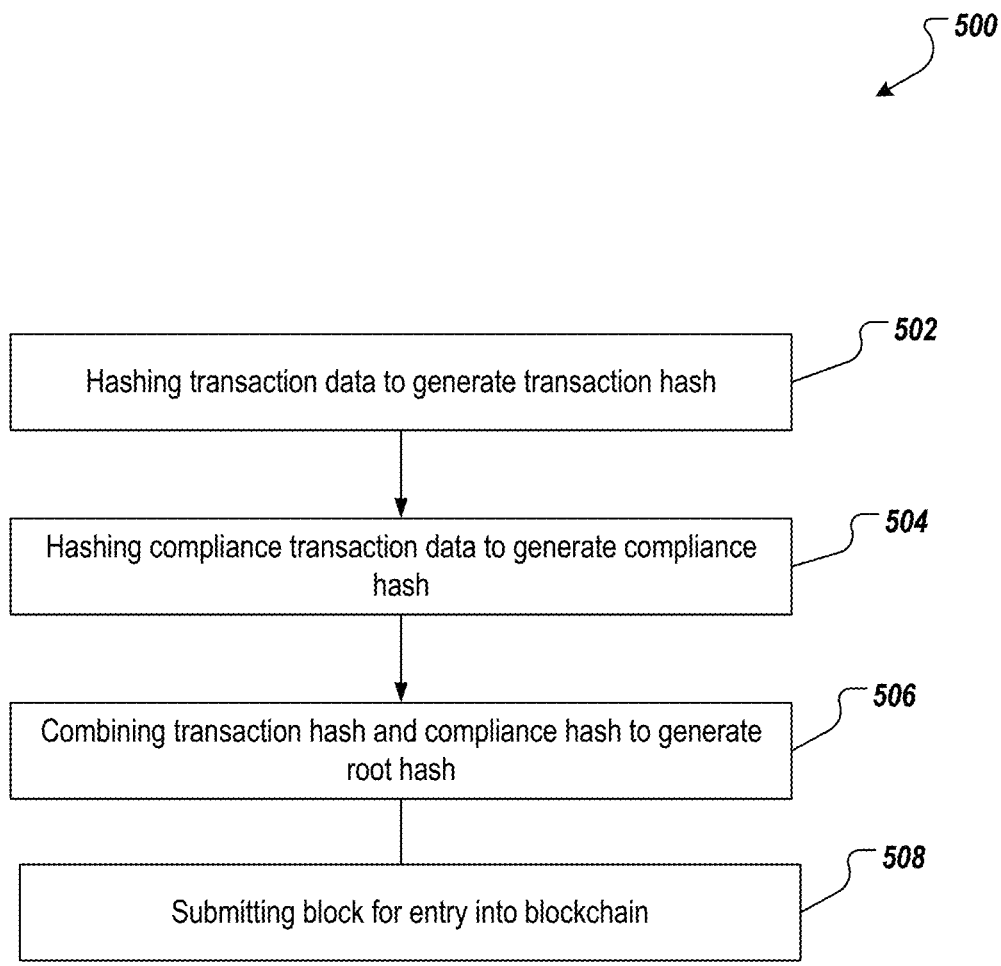
FIG. 5 is a flow chart illustrating an example of a process according to an implementation of the present disclosure.

FIG. 5 is a flow chart illustrating process 500 for submitting a block to be entered into a blockchain. Process 500 may initiate by hashing transaction data to transaction hash (502). As illustrated in FIG. 4, transaction data can be hashed in pairs (e.g., Tx0 and Tx1) to respectively generate transaction hashes Hash0 and Hash1. Process 500 may then hash compliance transaction data to generate a compliance hash (504). As illustrated in FIG. 4, compliance transaction data. Cx0 (434A) can be hashed to generate compliance transaction data cHash0 (424A). Process 500 may then combine transaction hash and compliance hash to generate root hash (506). As illustrated in FIG. 4, compliance hash cHash0 (424A) can be concatenated with transaction hashes Hash0 and Hash1 to generate root hash Hash_c01 (414A), as the root hash for block 404 being submitted for addition to blockchain. In general, the hashing process involves the use of a unique nonce with the mindset for proof of work. For example, when the nonce is added to the underlying payload data (e.g., transaction data, compliance transaction data, and previous hash value), the hash generated can have the requisite number of bits of leading zeros. Process 500 may then submit, to a blockchain network, the block (including transaction data and compliance transaction data) for entry into a blockchain (508).

Figure 6:
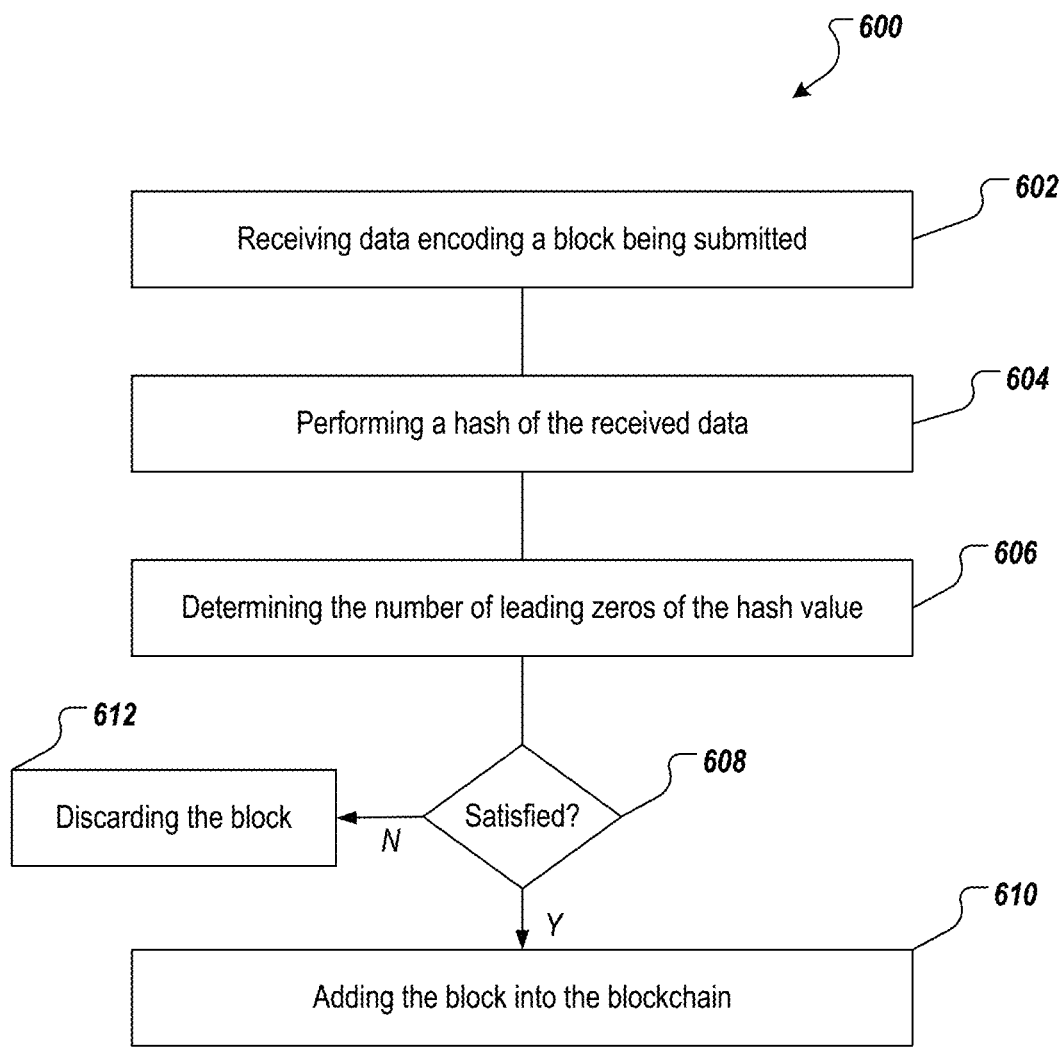
FIG. 6 is a flow chart illustrating another example of a process according to an implementation of the present disclosure.

FIG. 6 is a flow chart illustrating process 600 for validating a block being submitted for entry into a blockchain. Here, the block being submitted includes the nonce being added to the underlying payload data (e.g., transaction data, compliance transaction data, and previous hash value), and the process can verify by performing a hash function and then inspecting the generated hash value for the number of leading zeros. The duration of the verification process can be limited to the execution of one hash function, which is substantially more expedient than the process for identifying the corresponding nonce. In some cases, such Proof-of-Work under the consensus protocol can start with receiving data encoding a hash of the nonce and the underlying transaction data being submitted from a participant node (602). The data may be encrypted using the private key of the participant node. The data may then be decrypted, by a consensus node in receipt of such data, using the public key of the participant node. The consensus node may further perform a hash of the nonce and the underlying transaction data being submitted from a participant node (604). The consensus node may then determine the number of leading zeros in the hash value (606). Upon determining that the hash, which is a fixed length hash value, satisfies the requisite number of leading bits of zero (608), the consensus node may then add the submitted block into the copy of the block chain (610), as further described above in association with FIGS. 1 and 2. Otherwise, the consensus node may discard the block being submitted (612).

Figure 7:
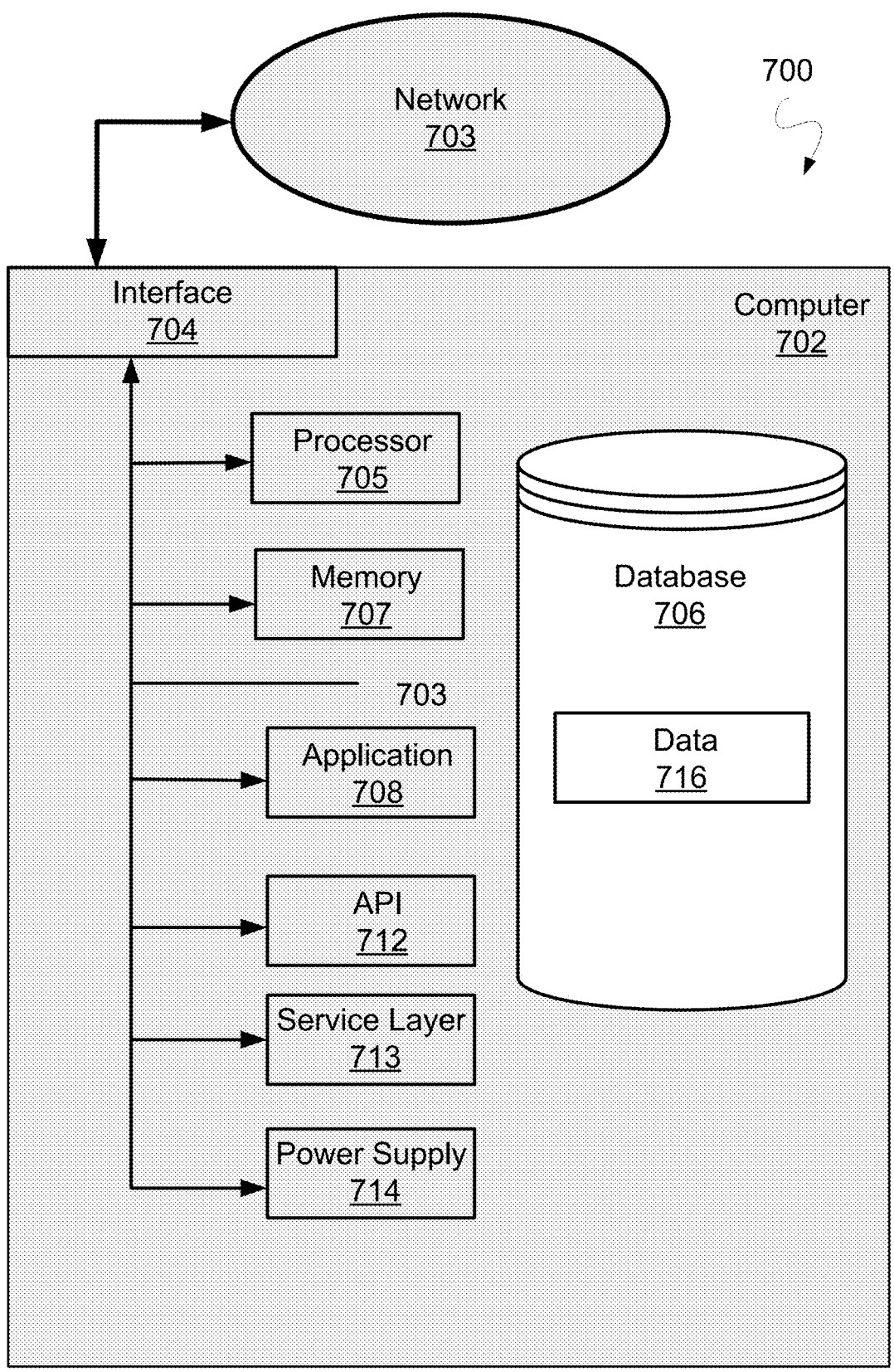
FIG. 7 is a block diagram illustrating an example of a computer system used to provide computational functionalities associated with described algorithms, methods, functions, processes, flows, and procedures, according to an implementation of the present disclosure.

FIG. 7 is a block diagram illustrating an example of a computer system 700 used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 704. In some implementations, one or more components of the computer 702 can be configured to operate within an environment, including cloud-computing-based, local, global, another environment, or a combination of environments.

The computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 703 (for example, from a client software application executing on another computer 702) and respond to the received requests by processing the received requests using a software application or a combination of software applications. In addition, requests can also be sent to the computer 702 from internal users, external or third-parties, or other entities, individuals, systems, or computers.

Each of the components of the computer 702 can communicate using a system bus 703. In some implementations, any or all of the components of the computer 702, including hardware, software, or a combination of hardware and software, can interface over the system bus 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 703 in a distributed environment. Generally, the interface 704 is operable to communicate with the network 703 and comprises logic encoded in software, hardware, or a combination of software and hardware. More specifically, the interface 704 can comprise software supporting one or more communication protocols associated with communications such that the network 703 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 703 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds data 716 encoding, for example, blocks incorporating a compliance hash in blockchain implementations described above.

The computer 702 also includes a memory 707 that can hold data for the computer 702, another component or components communicatively linked to the network 703 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 703. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method to enforce trustworthiness of nodes on a blockchain network hosting a blockchain, the method comprising:
   accessing, by a node of the blockchain network, a first set of data encoding a set of transaction records, wherein the blockchain network comprises a plurality of consensus nodes;
   at least based on the first set of data, generating, by the node, a transaction hash for the set of transaction records;
   accessing a second set of data encoding a compliance status of the node of the blockchain network;
   at least based on the second set of data, generating, by the node, a compliance hash for the node of blockchain network;
   generating, by the node, a root hash that combines the transaction hash and the compliance hash; and
   submitting, by the node and to the plurality of consensus nodes of the blockchain network, a block that includes the root hash for entry into the blockchain.

2. The computer-implemented method of claim 1, wherein the compliance status of the node is provided by at least one of: an integrity check of the node's hard disk drives, an integrity check of the node's file system, or an integrity check of a database file on the node.

3. The computer-implemented method of claim 1, wherein the transaction includes at least one smart contract, which, when executed on an Ethereum Virtual Machine (EVM), causes the EVM's hosting node to perform a function.

4. The computer-implemented method of claim 3, wherein the function includes generating a compliance status of the hosting node by generating at least one of: an integrity check of the hosting node's hard disk drives, an integrity check of the hosting node's file system, or an integrity check of a database file on the hosting node.

5. The computer-implemented method of claim 1, wherein generating the root hash comprises applying a hashing function using a nonce such that the root hash leads with at least a pre-determined number of zeros.

6. The computer-implemented method of claim 5, wherein applying a hashing function comprises: applying a secure hash algorithm (SHA)-256.

7. The computer-implemented method of claim 5, wherein the block being submitted further includes the nonce such that the consensus nodes determine the encoded transaction hash and compliance hash are valid before entering the block into the blockchain.

8. The computer-implemented method of claim 5, wherein the node is a consensus node, and wherein the root hash is a Merkel root hash.

9. A computer system to enforce trustworthiness of nodes on a blockchain network hosting a blockchain, the computer system residing on a node of the blockchain network and comprising at least one processor configured to perform operations of:
   accessing, by the node of the blockchain network, a first set of data encoding a set of transaction records, wherein the blockchain network comprises a plurality of consensus nodes;
   at least based on the first set of data, generating, by the node, a transaction hash for the set of transaction records;
   accessing a second set of data encoding a compliance status of the node of the blockchain network;
   at least based on the second set of data, generating, by the node, a compliance hash for the node of blockchain network;
   generating, by the node, a root hash that combines the transaction hash and the compliance hash; and
   submitting, by the node and to the plurality of consensus nodes of the blockchain network, a block that includes the root hash for entry into the blockchain.

10. The computer system of claim 9, wherein the compliance status of the node is provided by at least one of: an integrity check of the node's hard disk drives, an integrity check of the node's file system, or an integrity check of a database file on the node.

11. The computer system of claim 9, wherein the transaction includes at least one smart contract, which, when executed on an Ethereum Virtual Machine (EVM), causes the EVM's hosting node to perform a function.

12. The computer system of claim 11, wherein the function includes generating a compliance status of the hosting node by generating at least one of: an integrity check of the hosting node's hard disk drives, an integrity check of the hosting node's file system, or an integrity check of a database file on the hosting node.

13. The computer system of claim 9, wherein generating the root hash comprises applying a hashing function using a nonce such that the root hash leads with at least a pre-determined number of zeros.

14. The computer system of claim 13, wherein applying a hashing function comprises: applying a secure hash algorithm (SHA)-256.

15. The computer system of claim 13, wherein the block being submitted further includes the nonce such that the consensus nodes determine the encoded transaction hash and compliance hash are valid before entering the block into the blockchain.

16. The computer system of claim 13, wherein the node is a consensus node, and wherein the root hash is a Merkel root hash.

17. A non-transitory computer-readable medium comprising software to enforce trustworthiness of nodes on a blockchain network hosting a blockchain, which software, when executed by a processor of a node on the blockchain network, causes the processor to perform operations of:
- accessing, by the node of the blockchain network, a first set of data encoding a set of transaction records, wherein the blockchain network comprises a plurality of consensus nodes;
- at least based on the first set of data, generating, by the node, a transaction hash for the set of transaction records;
- accessing a second set of data encoding a compliance status of the node of the blockchain network;
- at least based on the second set of data, generating, by the node, a compliance hash for the node of blockchain network;
- generating, by the node, a root hash that combines the transaction hash and the compliance hash; and
- submitting, by the node and to the plurality of consensus nodes of the blockchain network, a block that includes the root hash for entry into the blockchain;
- wherein the compliance status of the node is provided by at least one of: an integrity check of the node's hard disk drives, an integrity check of the node's file system, or an integrity check of a database file on the node.

18. The non-transitory computer-readable medium of claim 17, wherein the transaction includes at least one smart contract, which, when executed on an Ethereum Virtual Machine (EVM), causes the EVM's hosting node to perform a function.

19. The non-transitory computer-readable medium of claim 18, wherein the function includes generating a compliance status of the hosting node by generating at least one of: an integrity check of the hosting node's hard disk drives, an integrity check of the hosting node's file system, or an integrity check of a database file on the hosting node.

20. The non-transitory computer-readable medium of claim 17, wherein generating the root hash comprises applying a hashing function using a nonce such that the root hash leads with at least a pre-determined number of zeros,
- wherein applying a hashing function comprises: applying a secure hash algorithm (SHA)-256,
- wherein the block being submitted further includes the nonce such that the consensus nodes determine the encoded transaction hash and compliance hash are valid before entering the block into the blockchain,
- wherein the node is a consensus node, and
- wherein the root hash is a Merkel root hash.

* * * * *